(12) United States Patent
Huang (10) Patent No.: US 11,252,416 B2
(45) Date of Patent: Feb. 15, 2022

(54) METHOD AND DEVICE OF COMPRESSION IMAGE WITH BLOCK-WISE BIT RATE CONTROL

(71) Applicant: HIMAX TECHNOLOGIES LIMITED, Tainan (TW)

(72) Inventor: Tsung-Yau Huang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 100 days.

(21) Appl. No.: 16/507,005

(22) Filed: Jul. 9, 2019

(65) Prior Publication Data
US 2021/0014500 A1 Jan. 14, 2021

(51) Int. Cl.
*H04N 19/146* (2014.01)
*H04N 19/176* (2014.01)
*H04N 19/18* (2014.01)
*H04N 19/124* (2014.01)

(52) U.S. Cl.
CPC ......... *H04N 19/146* (2014.11); *H04N 19/124* (2014.11); *H04N 19/176* (2014.11); *H04N 19/18* (2014.11)

(58) Field of Classification Search
CPC .. H04N 19/124; H04N 19/122; H04N 19/126; H04N 19/146; H04N 19/147; H04N 19/149; H04N 19/15; H04N 19/152
USPC .......................... 382/238–239, 232–235, 250
See application file for complete search history.

(56) References Cited

U.S. PATENT DOCUMENTS

| | | | | |
|---|---|---|---|---|
| 5,216,503 A | * | 6/1993 | Paik | H04N 21/2365 348/390.1 |
| 5,249,053 A | * | 9/1993 | Jain | H04N 19/86 348/207.99 |
| 5,253,078 A | * | 10/1993 | Balkanski | H04N 19/42 348/409.1 |
| 5,376,968 A | * | 12/1994 | Wu | H04N 19/503 375/E7.211 |
| 6,134,695 A | * | 10/2000 | Sasaki | H04N 19/176 375/E7.13 |
| 2002/0101932 A1 | * | 8/2002 | Montgomery | H03M 7/30 375/240.25 |
| 2002/0176629 A1 | * | 11/2002 | Labelle | G06F 16/583 382/232 |
| 2005/0123048 A1 | * | 6/2005 | Kondo | H04N 19/124 375/240.16 |
| 2005/0147308 A1 | * | 7/2005 | Kitamura | H04N 19/90 382/239 |
| 2005/0152606 A1 | * | 7/2005 | Wood | H04N 19/15 382/232 |

(Continued)

*Primary Examiner* — Sean M Conner
*Assistant Examiner* — Stephen M Brinich
(74) *Attorney, Agent, or Firm* — Winston Hsu (57) ABSTRACT

A method for compressing an image with bit rate control includes: compressing data of a current block with a compression level to produce compression data of the current block; in response to compression of the current block, accumulating a data size of compressed data of blocks that have been compressed to obtain an accumulated real size; in response to the compression of the current block, accumulating a target block size according to a number of blocks that have been compressed to obtain an accumulated target size; and adjusting the compression level for a next block according to at least the accumulated real size and the accumulated target size.

8 Claims, 4 Drawing Sheets

(56) References Cited

U.S. PATENT DOCUMENTS

2009/0067511 A1\* 3/2009 Wei .................... H04N 17/004
375/240.29

\* cited by examiner

METHOD AND DEVICE OF COMPRESSION IMAGE WITH BLOCK-WISE BIT RATE CONTROL

BACKGROUND OF THE INVENTION

1. Field of the Invention

The present invention relates generally to image compression and more particularly, to method and device of compression image with block-wise bit rate control.

2. Description of the Prior Art

In the digital world, Joint Photographic Experts Group (JPEG) standard is a commonly used for compressing and storing digital images. With JPEG encoding, image data can be compressed to reduce the amount of data without significantly affecting the clarity of the image. Typically, an input image would be decomposed into multiple blocks, each of which includes 8×8 pixels. A discrete cosine transform (DCT) is then performed to convert each block into DCT coefficients (i.e., frequency information). For each block, 64 DCT coefficients are produced, which include one "DC" coefficient as well as 63 "AC" coefficients. In a following quantization process, a quantization table/matrix is employed to quantize these DCT coefficients thereby to preserve low frequency information and discard high frequency detail as humans are less critical to the loss of information in this area. After the frequency information has been quantized, an entropy encoding process is performed to sequence and pack the quantized coefficients thereby to output compressed data in form of a bit stream.

However, many electronic systems are constrained in a size of storage space that can be allocated to storing images. Thus, implementations of the JPEG compression are often required to compress images in a favorable range of sizes no matter what the perceptual complexity of the images is. Hence, it is necessary to implement JPEG compression with bit rate control. Typically, bit rate control can be achieved by compressing an image a plurality of times. Firstly, it is obtained an estimate of a quantization factor that is used to obtain a desired target size of the compressed image. If the resultant size of the compressed image significantly exceeds the desired target size, then further compressions are required.

However, such implementations are unfavorable for pure hardware architecture. For example, it is necessary to deploy a divider circuit for adjusting quantization factors from a quantization table, thereby to achieve the desired target file size. In additional, it is also difficulty for the pure hardware architecture to implement JPEG compressions of multiple iterations. Therefore, there is a need to provide an innovative method and device to implement the JPEG compression with bit rate control.

SUMMARY OF THE INVENTION

With this in mind, it is one object of the present invention to provide a block-wise bit rate control implementation of JPEG compression. According to various embodiments of the present invention, each time a block of an input image is compressed through DCT process, quantization process, and encoding process, real size and desired target size of compressed data regarding the block will be considered. A compression level for a next block will be adjusted accordingly. As a result, bit rate of the image could be well controlled within a single pass compression. On the other hand, a quantization offsetting technique is used to quantize the DCT coefficients. With quantization offsets, various quantization factors can be provided to the quantization process with only one quantization table/matrix used. As a result, an effective implementation of JPEG compression is provided.

According to one embodiment of the present invention, a method for compressing an image with bit rate control is provided. The method comprises: compressing data of a current block with a compression level to produce compression data of the current block; in response to compression of the current block, accumulating a data size of compressed data of blocks that have been compressed to obtain an accumulated real size; in response to the compression of the current block, accumulating a target block size according to a number of blocks that have been compressed to obtain an accumulated target size; and adjusting the compression level for a next block according to at least the accumulated real size and the accumulated target size.

According to one embodiment of the present invention, an image compression device for compressing an image with bit rate control is provided. The image compression device comprises: a compression module and a bit rate control module. The compression module is arranged to compress data of a current block with a compression level to produce compression data of the current block. The bit rate control module comprises: a real size accumulating unit, a target size accumulating unit and a level adjustment unit. The real size accumulating unit, in response to compression of the current block, is arranged to accumulate a data size of compressed data of blocks that have been compressed to obtain an accumulated real size. The target size accumulating unit, in response to the compression of the current block, is arranged to accumulate a target block size according to a number of blocks that have been compressed to obtain an accumulated target size. The level adjustment unit is arranged to adjust the compression level for a next block according to at least the accumulated real size and the accumulated target size.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 1:
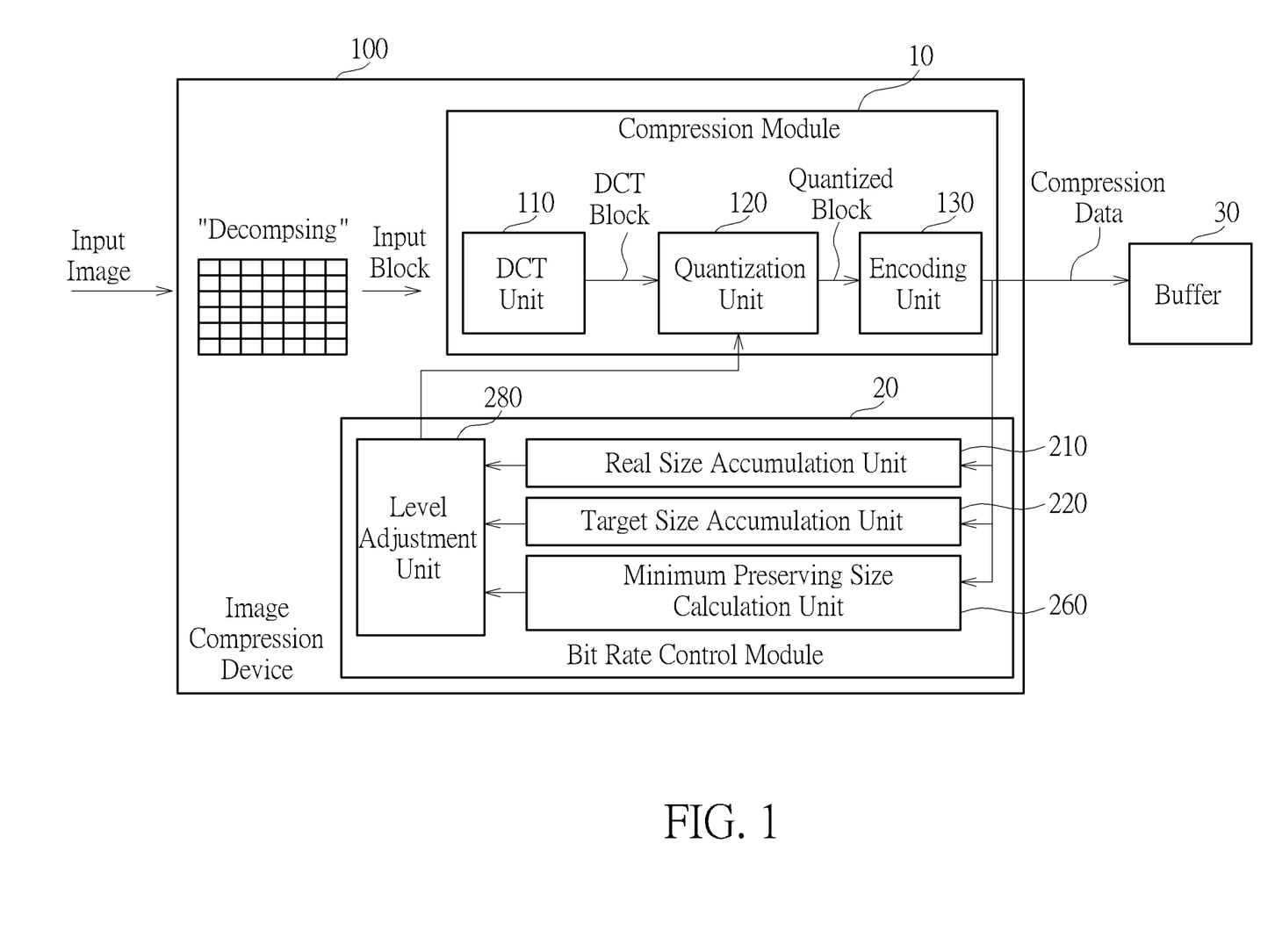
FIG. 1 illustrates a block diagram of an image compression device according to one embodiment of the present invention.
Figure 2:
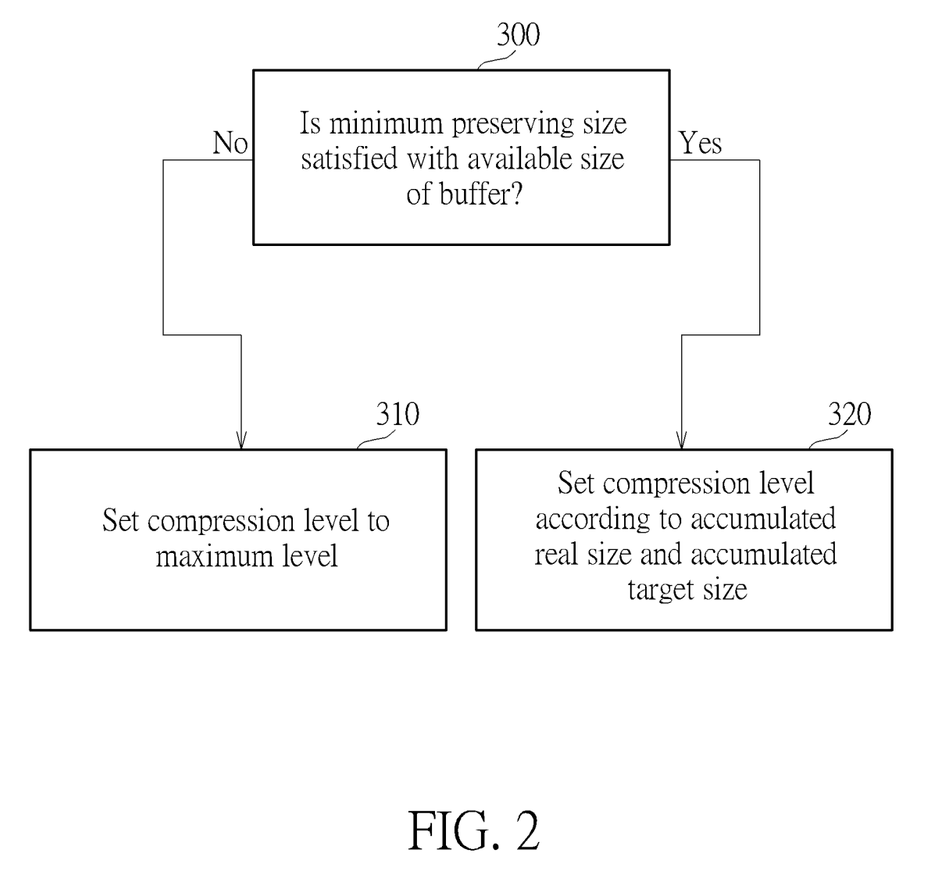
FIG. 2 illustrates a flow regarding how to set the compression level according to one embodiment of the present invention.

FIG. 1 illustrates a block diagram of an image compression device 100 according to one embodiment of the present invention. The image compression device 10 comprises a compression module 10 and a bit rate control module 20. The compression module 10 may comprise a Discrete Cosine Transform (DCT) unit 110, a quantization unit 120 and an entropy encoding unit 130. The DCT unit 110 is arranged to perform the DCT operation on each block (preferably including 8*8 pixels) of an image, thereby to produce a DCT block (preferably a 8*8 matrix) including a plurality of DCT coefficients (preferably 64 DCT coefficients). The DCT coefficients consists one DC coefficient and a plurality of AC coefficients (preferably one DC coefficient as well as 63 AC coefficients). The DCT block will be provided to the quantization unit 120 and each of the DCT coefficients will be quantized according to a corresponding quantization element in a given quantization table/matrix, thereby to obtain a resultant quantized block (the same size as the DCT block) including multiple quantum values. The resultant quantized block will be provided to the entropy encoding unit 130 thereby to convert the quantum values into a bit stream that is representative of the compressed data of the block. The bit stream will be stored in a buffer 30 for a variety of further processing and different purposes.

In the preferred embodiment, the image compression device 100 is intended to compress any input image to a fixed target file size, e.g., $K_{FILETARGET}$ bytes, which is determined by a size of storage space of the buffer 30. Hence, the bit rate control module 20 is arranged to control how the compression module 10 reduces amount of information from the input image in a block-wise manner. Specifically, by adjusting a quantization offset used in a quantization process of the quantization unit 120, the compression module 10 achieves different extents of data reduction.

The bit rate control module 20 comprises a target size accumulation unit 210, a real size accumulation unit 220, a minimum preserving size calculation unit 260 and a level adjustment unit 280. The real size accumulation unit 210 is arranged to accumulate a data size of compression data of blocks that have been compressed, thereby to provide and update an accumulated real size. For example, the compression module 10 have compressed block $B_1$, $B_2$, $B_3$ and $B_4$ of the input image and thus provides compression data $D_1$, $D_2$, $D_3$ and $D_4$, respectively, where sizes of the compressed data $D_1$, $D_2$, $D_3$ and $D_4$ are $K_1$, $K_2$, $K_3$ and $K_4$ bytes. Accordingly, the accumulated real size could be $(K_1+K_2+K_3+K_4)$ bytes. After the compression module 10 compresses block $B_5$ of the input image and provides compression data $D_5$ having the size of $K_5$ bytes, the real size accumulation unit 210 could update the accumulated real size as $(K_1+K_2+K_3+K_4+K_5)$ bytes.

The target size accumulation unit 220 is arranged to determine a target size regarding blocks that have been compressed, thereby to obtain an accumulated target size. Specifically, the target size accumulation unit 220 could determine a target size per block that is an intended data size of compressed data per block (hereinafter referred to as $K_{BLOCKTARGET}$). In a preferred embodiment, the target size per block $K_{BLOCKTARGET}$ could be $(K_{FILETARGET}/N)$ bytes, wherein N is the number of blocks that are decomposed from the input image. The target size accumulation unit 114 could provide the accumulated target size according to the target size per block and the number of blocks ($N_{COMPRESSED}$) within the input image that have been compressed by the compression module 10. That is, the accumulated target size could be $(K_{BLOCKTARGET} \times N_{COMPRESSED})$ bytes. In addition, the target size accumulation unit 220 could selectively adjust the target size per block $K_{BLOCKTARGET}$ according to the number of the blocks that have been compressed by the compression module 10. For example, before the compression module 10 have compressed $N_F$ blocks of an input image, the target size accumulation unit 220 may configure the target size per block $K_{BLOCKTARGET}$ as a lower value. Once the compression module 10 have compressed $N_F$ blocks of the input image, the target size accumulation unit 114 may configure the target size per block $K_{BLOCKTARGET}$ as a higher value. This is intended to preserve more size for those blocks that have not been encoded. Specifically, if there is no sufficient margin preserved, some of the blocks may need to be quantized with the highest quantization level (which could lead to significant loss in the image quality) in the worst case.

The level adjustment unit 280 will set a compression level for compression each block according to the accumulated real size and the accumulated target size, and the minimum preserving size.

Figure 3:
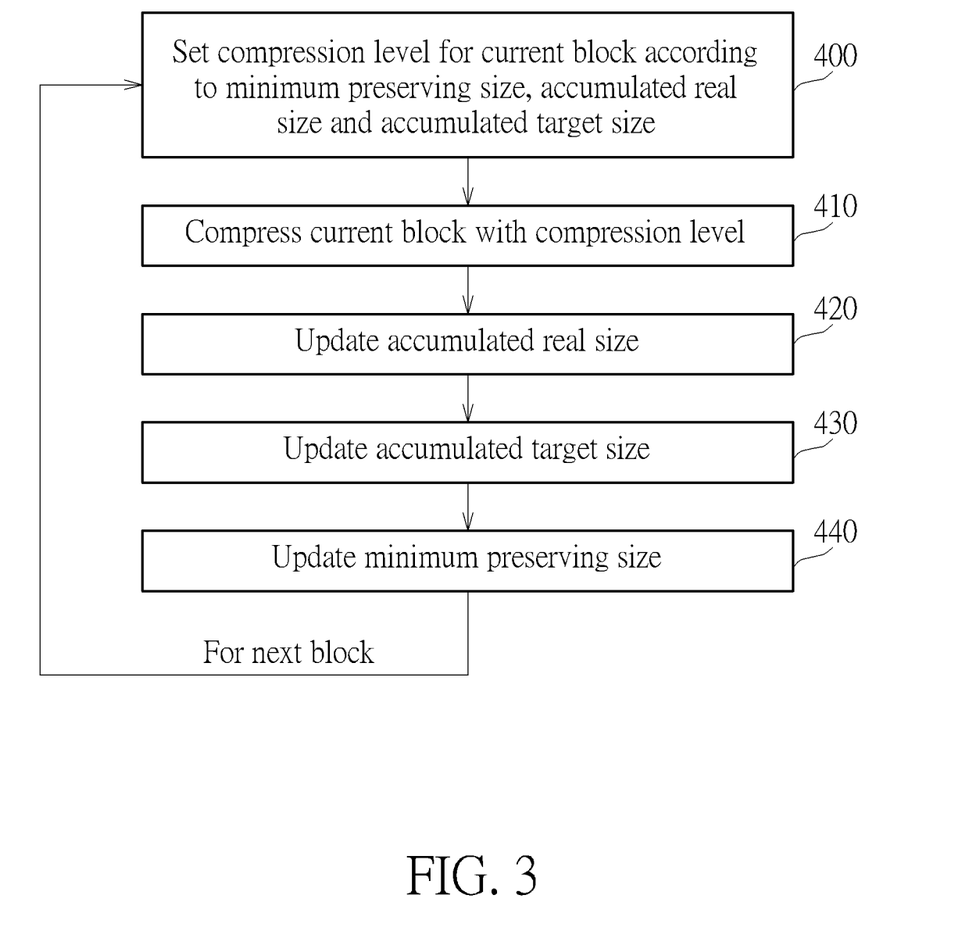
FIG. 3 illustrates a flow regarding how an image compression device processes a current block according to one embodiment of the present invention.

When the minimum preserving size is higher than the available size when a block is about to be compressed, the level adjustment unit 280 will set a maximum compression level for the block. FIG. 3 illustrates a flow regarding how the level adjustment unit 280 sets the compression level. At first, it is determined whether the minimum preserving size is greater than the available size. The minimum preserving size could be determined as follows:

$$K_{BLOCKMAX} + (K_{BLOCKMIN} * M) + K_{FIXED}$$

where "$K_{BLOCKMAX}$" is the maximum size of compressed data of a block and "$K_{BLOCKMIN}$" is the minimum size of compressed data of a block and "M" is the number of blocks that have not been compressed, which can be determined in advance according to the target file size and number of blocks decomposed from the image. "$K_{FIXED}$" is the data size of the end of image (EOI) tag, 0xFF and 0xD9, which usually costs 2 bytes.

In addition, the available size could be determined as follows:

$$K_{FILETARGET} - K_{REALSIZE}$$

"$K_{FILETARGET}$" is the target file size and "$K_{REALSIZE}$" is current accumulated real size, which is total real size of the blocks that have been compressed.

Before a block $B_i$ is to be compressed, it is first determined whether the available size "$K_{FILETARGET} - K_{REALSIZE}$" is greater than the minimum preserving size $K_{BLOCKMAX} + (K_{BLOCKMIN} * M) + K_{FIXED}$". If the available size is greater than the minimum preserving size, the flow goes to step 320; otherwise, the flow goes to step 310. At step 310, as the available size "$K_{FILETARGET} - K_{REALSIZE}$" is not greater than the minimum preserving size $K_{BLOCKMAX} + (K_{BLOCKMIN} * M) + K_{FIXED}$" the level adjustment unit 280 needs to set a maximum compression level to compress the block $B_i$, thereby to save more size and space for those blocks that have not been compressed. At step 320, as the available size is greater than the minimum preserving size, the level adjustment unit 280 will set the compression level according to accumulated real size and the accumulated target size.

If the accumulated real size is greater than or equal to the accumulated target size, the level adjustment unit 280 will level up the current compression level (that is used for compressing the block $B_{(i-1)}$), which leads to discarding more information from the block $B_i$. On the other hand, if the accumulated real size is lower than the accumulated target size, the level adjustment unit 280 will level down the current compression level (that is used for compressing the block $B_{(i-1)}$), which leads to preserving more information of the block $B_i$.

In the present invention, the quantization unit 220 quantizes the DCT coefficients of a DCT block (converted from an input block) based on the compression levels L1-$L_{MAX}$. The compression levels L1-$L_{MAX}$ are set by the level adjustment unit 280 according to the accumulated real size, the accumulated target size and the maximum preserving size. According to one embodiment, there are compression levels L1-$L_{MAX}$ (and how the quantization unit 220 quantizes the DCT coefficients according to the compression levels) as follows:

L1: Q_X = sign(X) * floor((abs(X)/Qs) + 0.5), for AC 32-63;

L2: Q_X = sign(X) * floor((abs(X)/Qs) + 0.25), for AC 32-63;

L3: Q_X = sign(X) * floor((abs(X)/Qs) + 0), for AC 32-63;

L4: Q_X = sign(X) * floor((abs(X)/Qs) - 0.25), for AC 32-63;

L5: Q_X = 0, for AC 32-63;

-continued

L6: Q_X = 0, for AC 31-63;

L7: Q_X = 0, for AC 30-63;

...

$L_{MAX}$: Q_X = 0, for AC 1-63;

where "X" represents an input DCT coefficient of an DCT block, "Qs" represents a quantization element of a predetermined quantization table/matrix that corresponds to the input DCT coefficient X, "abs (X)" is an absolute value of the DCT coefficient X, "sign (X)" is a polarity of the DCT coefficient X, "floor (i)" is a floor function of "i", which gives as output the greatest integer less than or equal to i, "Q_X" represent a quantized result, and "0.5", "0.25", "0", "-0.25" are exemplary quantization offsets (; according to various embodiments of the present invention, there could different quantization offsets used for different compression levels). As indicated above, the compression level L1 could be the lowest compression level reserving most frequency information of a block, while the compression level $L_{MAX}$ could be the highest compression level discarding most frequency information from a block. When the compression level increases from L1 to L4, it tends to quantize the AC coefficients as lower quantized values. When the compression level increases from L5, more and more AC coefficients will be quantized as zero. At the maximum compression level $L_{MAX}$, all the AC coefficients will be quantized as zero, which means all the AC frequency information of a block is discarded.

According to the compression level and the quantization offsets set by the level adjustment unit 280, the quantization unit 220 could implement compression adjustment in a block-wise manner. That is, the quantization unit 220 is able to reduce data of each block to different extents within single input frame.

FIG. 3 illustrates a flow regarding how the image compression device 100 processes a current block according to one embodiment of the present invention.

At step 400, the level adjustment unit 280 sets a current compression level for compressing a current block, e.g. block $B_i$ of an input image according to the accumulated real size, the accumulated target size and the minimum preserving size. At this moment, the accumulated real size is an accumulation of data sizes of compressed blocks, i.e., blocks $B_0$-$B_{(i-1)}$. In addition, the accumulated target size is i*$K_{TARGETBLOCK}$ bytes ("i" is the number of blocks $B_0$-$B_{(i-1)}$). Moreover, the minimum preserving size is "$K_{BLOCKMAX} + (K_{BLOCKMIN} * (i)) + K_{FIXED}$" where N is a total number of blocks that are decomposed from the input image.

At step 410, the compression module 10 compresses the block $B_i$ according to the compression level set in step 410. Specifically, the quantization unit 220 quantizes a DCT block that is converted from the block $B_i$ with the compression level set in step 410. After encoded, the compression module 10 outputs a bit stream that is representative of the compressed data of the block $B_i$.

At step 420, the real size accumulation unit 210 updates the accumulated real size with the size of compressed data of the block $B_i$. As a consequence, the accumulated real size will be the accumulation of sizes of compressed data of blocks $B_0$-$B_i$.

At step 430, the target data size accumulation unit 220 updates the accumulated target size with the number of blocks $B_0$-$B_i$. As a consequence, the accumulated target size will be the $(i+1)*K_{BLOCKTARGET}$ bytes.

At step 440, the minimum preserving size calculation unit 260 would update the minimum preserving size in response to the compression of block $B_i$. The updated minimum preserving size in response to the compression of block $B_i$ will be $K_{BLOCKMAX}+K_{BLOCKMIN}*(N-(i+1))+K_{FIXED}$. Then, if there are still blocks of the input image that have not been compressed by the compression module 10, the flow returns to step 410, starting to set the compression level for the block $B_{(i+1)}$ according to the updated accumulated real size, the updated accumulated target size and the updated minimum preserving size.

Figure 4:
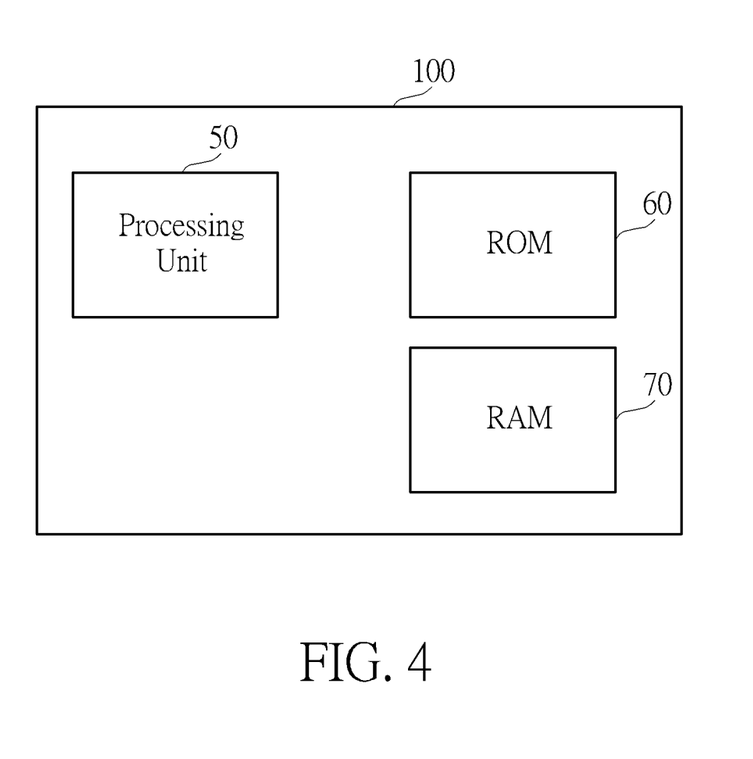
FIG. 4 illustrates an software-based implementation of an image compression device according to one embodiment of the present invention.

FIG. 4 illustrates a block diagram of a software-based implementation of an image compression device according to one embodiment of the present invention. As illustrated, the image compression device 100 comprises a processing unit 50, a read-only memory (ROM) 60 and a random access memory (RAM) 70. The processing unit 50 is arranged to fetch and execute instructions written in the ROM 60 as a program in advance, thereby to implement functions provided by the compression module 10 and the bit rate control module 20 as well as their individual components. In addition, the read-only memory (ROM) 60 may also stores a quantization table/matrix, and quantization offsets.

The RAM 70 may be used as a working area for temporarily saving intermediate processing data of calculation, including (but not limited to) accumulated real size, accumulated target size, minimum preserving size. Also, a portion of the RAM 70 could be served as the buffer 30.

In conclusion, the present invention provides a block-wise bit rate control implementation for JPEG compression. Each time a block of an input image is compressed through DCT process, quantization process, and encoding process, real size and target size of compressed data regarding the block will be considered. A compression level for a next block will be adjusted according to the accumulated real size and the accumulated target size (also the minimum preserving size). With the block-wise adjustment on the compression, the present invention can well control the size of the compressed image without multiple iterations of compressions. On the other hand, a quantization offsetting technique is used to quantize the DCT coefficients. With quantization offsets, various quantization factors can be provided to the quantization process with only one quantization table/matrix used. Therefore, an effective implementation of JPEG compression is provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for compressing an image with bit rate control, comprising:
    compressing data of a current block of a plurality of blocks of the image with a compression level to produce compression data of the current block;
    in response to compression of each current block, accumulating a data size of the current block to obtain an accumulated real size corresponding to compressed data of blocks that have been compressed;
    in response to the compression of each current block, accumulating a target block size of the current block to obtain an accumulated target size corresponding to the blocks that have been compressed;
    adjusting the compression level for a next block according to at least the accumulated real size and the accumulated target size;
    determining a minimum preserving size according to at least a minimum preserving block size and a number of blocks that have not been compressed;
    determining an available size; and
    adjusting the compression level to a maximum level if the minimum preserving size is greater than the available size.

2. The method of claim 1, wherein the step of compressing data of the current block with the compression level to produce the compression data of the current block comprises:
    converting data of the current block into DCT coefficients;
    determining a quantization offset according to the compression level; and
    quantizing at least one of the DCT coefficients according to a quantization table/matrix and the quantization offset.

3. The method of claim 1, the step of determining the available size comprises:
    determining the available size according to a target file size of the image and the accumulated real size.

4. The method of claim 1, further comprising:
    setting the target block size as an initial value if the number of the blocks that have been compressed is higher than a block number threshold; and
    setting the target block size to be lower than the initial value if the number of the blocks that have been compressed is lower than the block number threshold.

5. An image compression device for compressing an image with bit rate control, comprising:
    a compression module, arranged to compress data of a current block of a plurality of blocks of the image with a compression level to produce compression data of the current block;
    a bit rate control module, comprising:
        a real size accumulating unit, in response to compression of each current block, arranged to accumulate a data size of the current block to obtain an accumulated real size corresponding to compressed data of blocks that have been compressed;
        a target size accumulating unit, in response to the compression of each current block, arranged to accumulate a target block size of the current block to obtain an accumulated target size corresponding to the blocks that have been compressed; and
        a level adjustment unit, arranged to adjust the compression level for a next block according to at least the accumulated real size and the accumulated target size; and
        a minimum preserving size calculation unit, arranged to determine a minimum preserving size according to at least a minimum preserving block size and a number of blocks that have not been compressed; and arranged to determine an available size;
        wherein the level adjustment unit adjusts the compression level to a maximum level if the minimum preserving size is greater than the available size.

6. The image compression device of claim 5, wherein the compression module comprises:
    a discrete cosine transform (DCT) unit, arranged to convert data of the current block into DCT coefficients;
    a quantization unit, arranged to determine a quantization offset according to the compression level; and quantize at least one of the DCT coefficients according to a quantization table/matrix and the quantization offset.

7. The image compression device of claim 5, wherein the minimum preserving size calculation unit determines the available size according to a target file size of the image and the accumulated real size.

8. An image compression device for compressing an image with bit rate control, comprising:
- a compression module, arranged to compress data of a current block of a plurality of blocks of the image with a compression level to produce compression data of the current block;
- a bit rate control module, comprising:
  - a real size accumulating unit, in response to compression of each current block, arranged to accumulate a data size of the current block to obtain an accumulated real size corresponding to compressed data of blocks that have been compressed;
  - a target size accumulating unit, in response to the compression of each current block, arranged to accumulate a target block size of the current block to obtain an accumulated target size corresponding to the blocks that have been compressed, wherein the target size accumulation unit further sets the target block size as an initial value if the number of the blocks that have been compressed is higher than a block number threshold; and sets the target block size to be lower than the initial value if the number of the blocks that have been compressed is lower than the block number threshold; and
  - a level adjustment unit, arranged to adjust the compression level for a next block according to at least the accumulated real size and the accumulated target size.

* * * * *